(12) United States Patent
Low et al.

(10) Patent No.: US 8,266,490 B2
(45) Date of Patent: Sep. 11, 2012

(54) APPARATUS AND METHOD FOR REVERSE LINK TRANSMISSION IN AN ACCESS TERMINAL

(75) Inventors: Su-Lin Low, San Diego, CA (US); Jae Sun Lee, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 789 days.

(21) Appl. No.: 12/420,654

(22) Filed: Apr. 8, 2009

(65) Prior Publication Data
US 2010/0262881 A1 Oct. 14, 2010

(51) Int. Cl.
*G06F 11/00* (2006.01)
(52) U.S. Cl. .......................... 714/749; 714/748; 714/746
(58) Field of Classification Search .................. 714/748, 714/749, 746
See application file for complete search history.

(56) References Cited

U.S. PATENT DOCUMENTS

| | | | |
|---|---|---|---|
| 2007/0025300 A1* | 2/2007 | Terry et al. | 370/335 |
| 2007/0047485 A1* | 3/2007 | Gorokhov et al. | 370/329 |
| 2007/0070952 A1* | 3/2007 | Yoon et al. | 370/334 |
| 2009/0201948 A1* | 8/2009 | Patwardhan et al. | 370/474 |

* cited by examiner

*Primary Examiner* — Scott Baderman
*Assistant Examiner* — Sarai Butler
(74) *Attorney, Agent, or Firm* — Richard K. Huffman; James W. Huffman (57) ABSTRACT

A method for providing improved reverse link transmission timing in an access terminal is provided. The method includes processing automatic repeat request (ARQ) bits from a MAC bit processing unit for a previous sub-frame. The ARQ bits comprise a hybrid ARQ (H-ARQ) bit, a last ARQ (L-ARQ) bit, and a packet ARQ (P-ARQ) bit. The method also includes calculating the maximum allowed reverse rate and grant size for a MAC flow. The method further includes distributing grants to each application in the MAC flow. The method also includes storing a stored read pointer in an application transmit queue, for each application in the MAC flow. The method also includes preparing data for transmission, in response to storing the stored read pointer for each application in the MAC flow, based on the ARQ bits. The method also includes transmitting the data.

25 Claims, 7 Drawing Sheets

APPARATUS AND METHOD FOR REVERSE LINK TRANSMISSION IN AN ACCESS TERMINAL

FIELD OF THE INVENTION

The present invention relates in general to wireless communication, and more particularly to an apparatus and method to improve reverse link transmission timing in an access terminal.

BACKGROUND OF THE INVENTION

CDMA2000 is a third-generation (3G) wideband; spread spectrum radio interface system that uses the enhanced service of Code Division Multiple Access (CDMA) technology to facilitate data capabilities, such as internet and intranet access, multimedia applications, high-speed business transactions, and telemetry. The focus of CDMA2000, as is that of other third-generation systems, is on network economy and radio transmission design to overcome the limitations of a finite amount of radio spectrum availability. Several improvements have been added under the CDMA200 framework, and are continuing to be added. One such improvement is high rate packet data (HRPD). HRPD was initially implemented as a single carrier to improve forward link throughput, however it has evolved to a multi-carrier with improved forward and reverse links. The HRPD revision A specifications are contained within the CDMA2000 High Rate Packet Data Air Interface Specification, 3GPP2 C.S0024-A Version 2.0, maintained by the $3^{rd}$ Generation Partnership Project (3GPP2), which are herein incorporated by reference for all intents and purposes.

The revision A HRPD system employs hybrid Automatic Repeat Request (H-ARQ). H-ARQ is the bit sent on an ARQ channel in response to the 1st, 2nd, and 3rd sub-packet of a reverse-link physical packet to support physical layer ARQ. A method for transmitting broadcast signals using H-ARQ uses a scheme for dividing one encoder packet into a plurality of sub-packets and transmitting the sub-packets using a plurality of slots. A slot is a unit of time equal to 1.667 ms. A receiver receiving the sub-packets performs decoding thereon by combining the sub-packets using an Incremental Redundancy (IR) scheme.

In the reverse link transmission access terminal (AT) protocol, the AT transmits sub-packets to the access network (AN), and the AN responds with an ACK if the AT correctly received the packet or a NAK if the AT incorrectly received the packet. Following receipt of the ACK/NAK, the AT is required to generate either the first sub-packet of the next physical layer packet (if the AT receives an ACK from the AN) or the next sub-packet in sequence for the current physical layer packet (if the AT receives a NAK from the AN).

Regardless of whether the AT received an ACK or a NAK from the AN, the AT is required to transmit the next sub-packet in the sub-frame immediately following the sub-frame containing the ACK/NAK. This places large demands on the AT processor to read the ACK/NAK, determine the next sub-packet to be sent, and prepare the next sub-packet for transmission. Increased processing demands mean that the AT requires a faster or more capable processor. Therefore, what is needed is a means to reduce the processing demands by creating a larger timing window to process ACK/NAK data in reverse link ATs.

BRIEF SUMMARY OF INVENTION

The present invention provides a method for providing improved reverse link transmission timing in a revision A high-rate packet data (HRPD) access terminal. The method includes processing automatic repeat request (ARQ) bits from a Media Access Control (MAC) bit processing unit for a previous sub-frame, wherein the ARQ bits comprise a hybrid ARQ (H-ARQ) bit, a last ARQ (L-ARQ) bit, and a packet ARQ (P-ARQ) bit. The method also includes calculating the maximum allowed reverse rate and grant size for a MAC flow, and distributing grants to each application in the MAC flow. The method also includes storing a stored read pointer in an application transmit queue, for each application in the MAC flow. The method also includes preparing data for transmission, in response to storing the stored read pointer for each application in the MAC flow, based on the ARQ bits. The method also includes transmitting the data on the reverse traffic channel.

In one aspect, the present invention provides an access terminal providing improved reverse link transmission timing in a revision A high-rate packet data (HRPD) access terminal. The access terminal includes a MAC bit processing unit, configured to process automatic repeat request (ARQ) bits from for the previous sub-frame, wherein the ARQ bits comprise a hybrid ARQ (H-ARQ) bit, a last ARQ (L-ARQ) bit, and a packet ARQ (P-ARQ) bit. The access terminal also includes an application transmit queue, comprising an application packet the access terminal transmits, a read pointer, and a stored read pointer. The access terminal also includes a reverse traffic channel MAC (RTM) subtype3 protocol, configured to read processed ARQ bits from the MAC bit processing unit, calculate the maximum allowed reverse rate and grant size for a MAC flow, distribute grants to all applications in the MAC flow, store a stored read pointer in the application transmit queue for all applications in the MAC flow, prepare data for transmission, and transmit the data.

An advantage of the present invention is that it relaxes reverse channel timing constraints for revision A high rate packet data (HRPD) access terminals, allowing the access terminal to potentially use less expensive processing and, memory resources. This can decrease the cost of a revision A HRPD access terminal, making it more competitive and affordable compared with other alternatives.

Another advantage of the present invention is that by relaxing reverse channel timing constraints for revision A high rate packet data (HRPD) access terminals, the access terminal can potentially use lower power processing and memory resources. This can decrease the power requirements, increasing battery life or allowing the access terminal to use smaller and less expensive batteries.

DETAILED DESCRIPTION OF THE INVENTION

Figure 1:
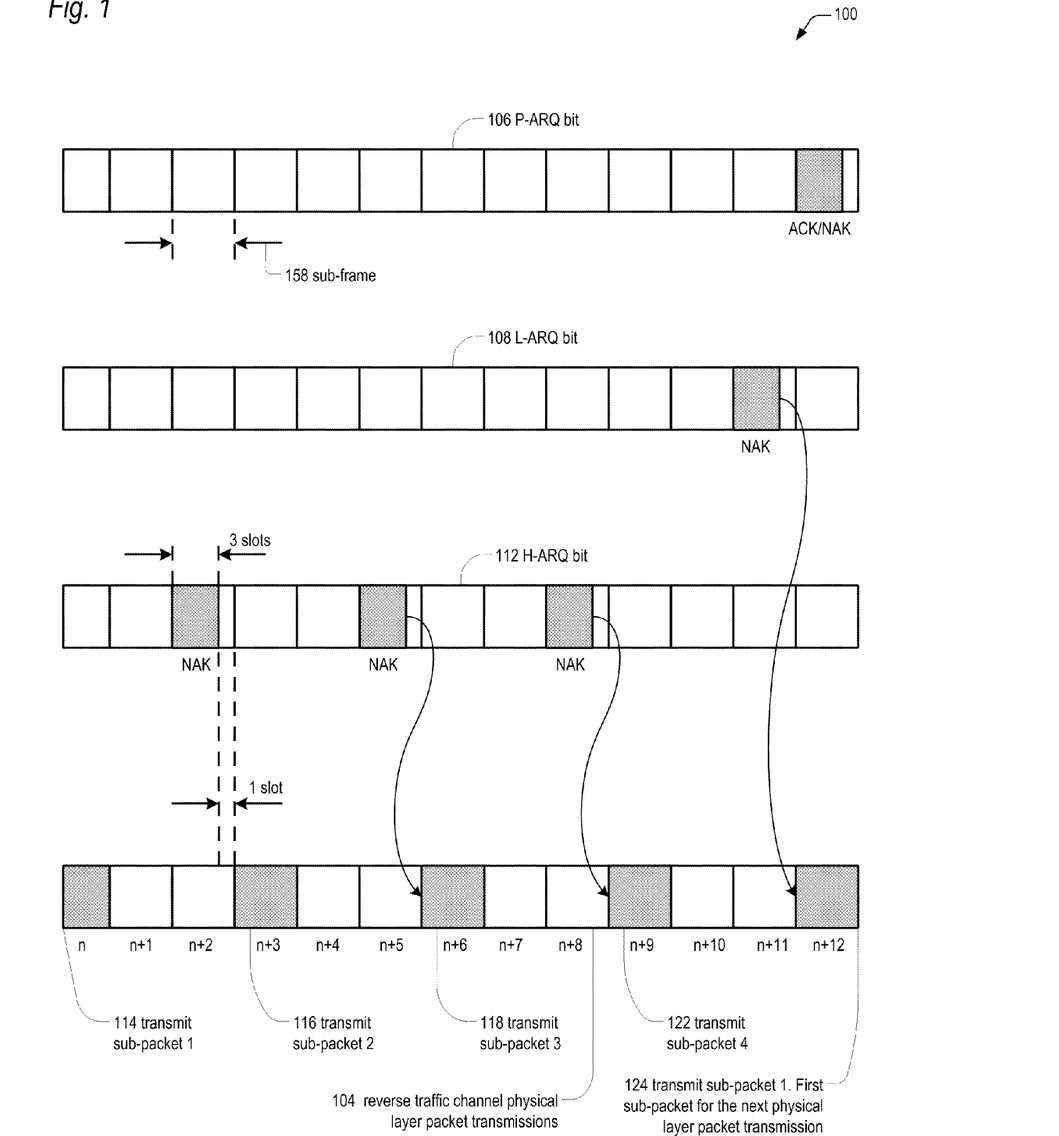
FIG. 1 is a reverse link timing sequence for a revision A HRPD access terminal of the related art.

Referring now to FIG. 1, a reverse link timing sequence 100 for a revision A HRPD access terminal (AT) of the related art is shown. The illustrated sequence is for an interlace of three, where the AT transmits sub-packets for the same physical layer packet every third sub-frame 158. The AT transmits reverse traffic channel physical layer packet transmissions 104 to the access network (AN), and the AN responds with a P-ARQ bit 106, an L-ARQ bit 108, and an H-ARQ bit 112 on the ARQ channel, depending on which sub-packet the AT last transmitted. The sequence begins when the AT transmits sub-packet 1 114 to the AN in sub-frame n. The AN responds in sub-frame n+2 with either an ACK (indicating successful receipt of sub-packet 1 114) or a NAK (indicating unsuccessful receipt of sub-packet 1 114). In the example shown, the H-ARQ bit 112 is a NAK, so the AT will transmit sub-packet 2 116 to the AN in sub-frame n+3. The AN responds in sub-frame n+5 with a NAK for the H-ARQ bit 112, so the AT will transmit sub-packet 3 118 to the AN in sub-frame n+6. Again, the AN responds in sub-frame n+8 with a NAK for the H-ARQ bit 112, so the AT will transmit sub-packet 4 122 to the AN in sub-frame n+9. Since sub-packet 4 122 is the last sub-packet in the reverse traffic channel physical layer packet transmission 104, the AN responds with the Last ARQ (L-ARQ) bit 108 in sub-frame n+11 and the packet ARQ (P-ARQ) bit 106 in sub-frame n+12. The AT transmits the first sub-packet 124 of the next physical layer packet in sub-frame n+12.

The AN always generates L-ARQ 108 and H-ARQ 112 ACK or NAK in the sub-frame immediately preceding the next sub-frame transmission, regardless of the interlace. The ACK or NAK is 3 slots in duration, leaving only 1 slot for the AT to correctly decode the ACK or NAK, select the next packet data for transmission, and prepare and encode the data for the next packet. This puts difficult timing constraints on the AT processor, which may result in using a faster and more expensive processor than is otherwise required.

Figure 2:
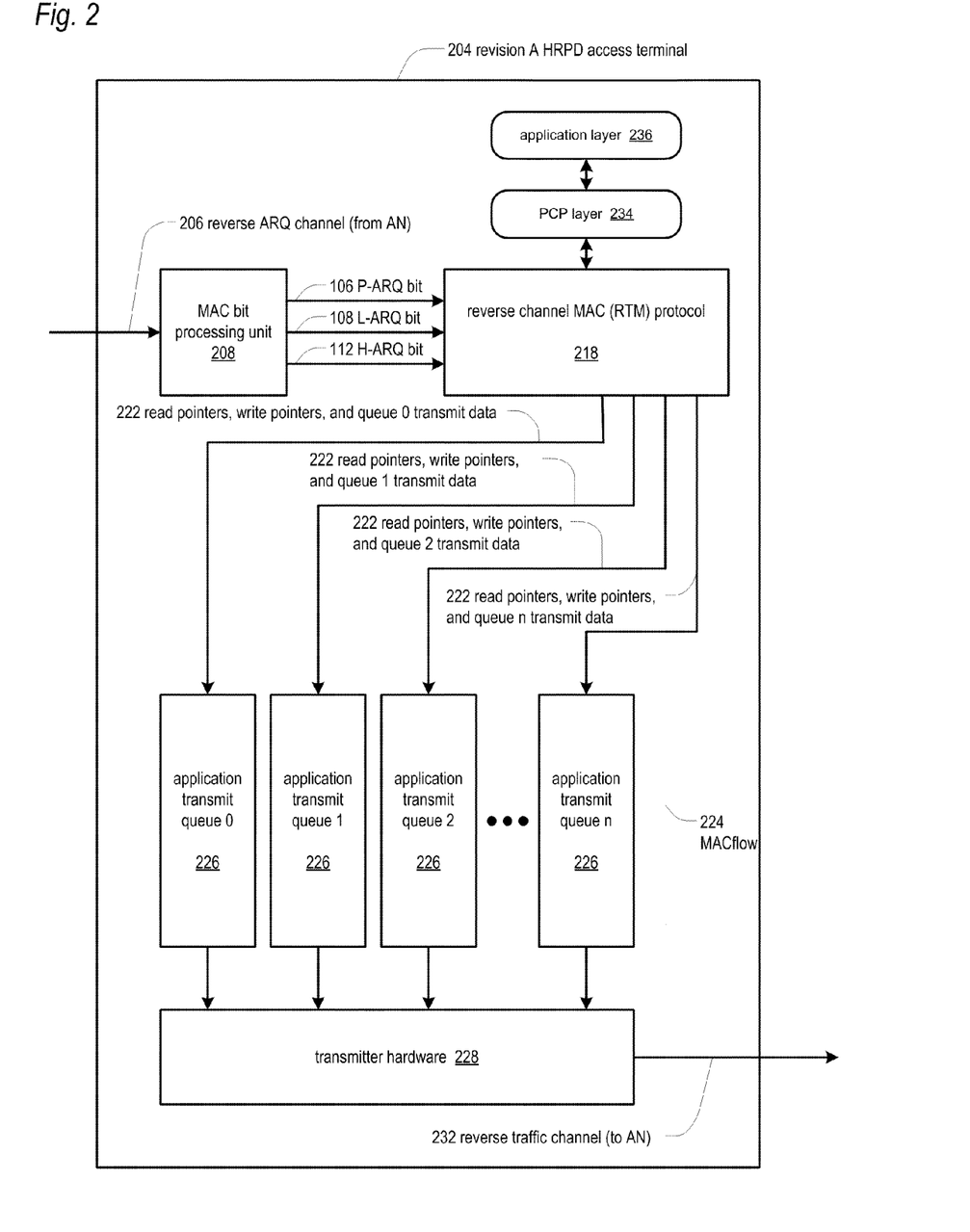
FIG. 2 is a block diagram of a revision A HRPD access terminal of the present invention.

Referring now to FIG. 2, a block diagram of a revision A HRPD access terminal 204 of the present invention is shown. Media Access Control (MAC) bit processing unit 208 receives and decodes automatic repeat request (ARQ) bits from the reverse ARQ channel 206, and provides the decoded bits to the reverse traffic channel MAC (RTM) protocol 218. The decoded bits are the same as shown in FIG. 1, and include a P-ARQ bit 106, an L-ARQ bit 108, and an H-ARQ bit 112. The RTM 218 communicates with a packet consolidation protocol (PCP) layer 234 and an application layer 236 to determine the order of next sub-packet transmission and prepare the sub-packets accordingly. The PCP layer 234 contains protocols within the HRPD connection layer protocol stack, and provides transmit prioritization and packet encapsulation for the connection layer. The application layer 236 contains applications for carrying signals and user traffic over the air, and generates and receives data through the MAC and lower layers. One such example of an application is the packet data application which is responsible for internet protocol (IP) or point-to-point (PPP) data exchange. Another example is the signaling application which sends and receives control signaling messages. The interaction between the application layer and connection layer is described in more detail with respect to FIG. 3.

The RTM 218 generates read pointers, write pointers, and transmit data 222 for each application transmit queue 226 in each MAC flow 224. A MAC flow 224 is a logical grouping of radio link flows at the MAC layer, which have the same quality of service (QOS) properties. Different MAC flows 224 are defined for different groups of radio link flows with different QOS requirements.

There is one or multiple application transmit queues 226 per MAC flow 224, depending on quality of service (QOS) requirements of each application. The operations of the application transmit queues 226 are described in more detail with respect to FIG. 4 and the flowcharts in FIGS. 6-8. After setting up each application transmit queue 226, the RTM 218 directs specific application transmit queues 226 to transfer data to transmitter hardware 228 based on the current interlace being transmitted and the status of individual application transmit queues 226. The transmitter hardware 228 encodes and transmits sub-packets on the reverse traffic channel 232.

Figure 3:
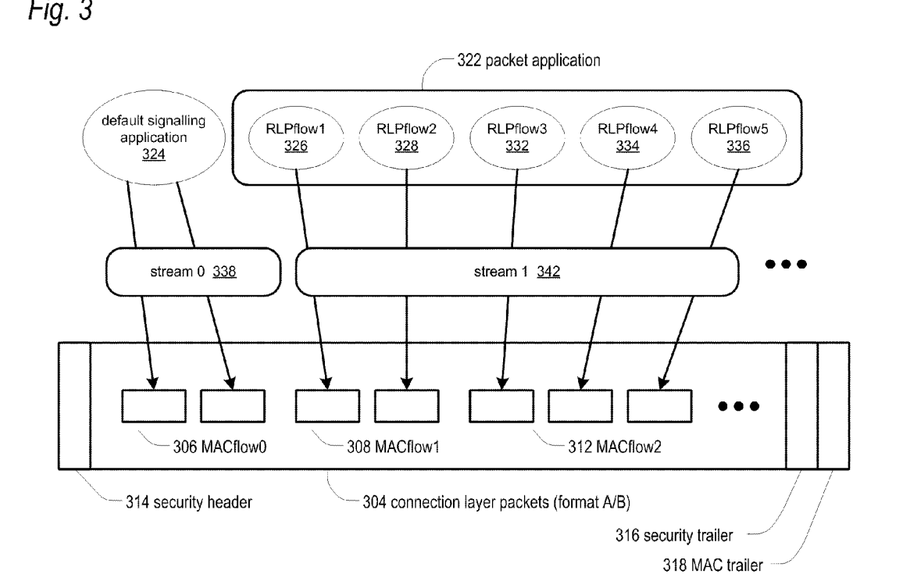
FIG. 3 is a block diagram of the reverse layer connection layer packet construction of the present invention.

Referring now to FIG. 3, a block diagram of the reverse layer connection layer packet construction of the present invention is shown. Two types of connection layer packets are defined: format A and format B. Format A packets are maximum length packets (including lower layer headers), and contain one session layer packet and do not have connection layer headers or padding. Format B packets are maximum length packets (including lower layer headers), and contain one or more session layer packets and have a connection layer header(s). The protocol places the connection layer header in front of each session layer packet and enough padding to create a maximum length packet.

In the example shown in FIG. 3, a default signaling application 324 and a packet application 322 are shown. The application layer services multiple applications. It provides the default signaling application for transporting air interface protocol messages. It also provides the default packet application for transporting user data. The packet application 322 may contain several reverse link packet flows, labeled RLPflow1 326 through RLPflow5 336. However, a given packet application 322 may contain fewer or more RLPflows than are shown in FIG. 3. Each of the application packets are passed through a stream layer. Two streams are shown in FIG. 3, stream 0 338 and stream 1 342. Stream 0 338 and stream 1 342 append a header to each of the application packets, and provides multiplexing of distinct application streams. The Default Stream Protocol provides four streams. Stream 0 338 is dedicated to signaling and defaults to the default signaling application. Other applications use stream 1 342, and in the example shown, the default packet application with RLPflow1 326 through RLPflow5 336 use stream 1 342.

The connection layer groups packets into a common connection layer packet 304, and organizes the packet payload according to MAC flow. Each connection layer packet 304 comprises a security header 314, security trailer 316, and a MAC trailer 318. Each of the RLPflows 324-336 are grouped into common MAC flows, depending on the quality of service (QOS) requirement for each RLPflow 324-336. A MAC flow is a logical grouping of radio link flows at the MAC layer, which have the same QOS properties. Therefore, different MAC flows are defined for different groups of radio link flows with different QOS requirements. Although three MAC flows 306, 308, and 312 are shown in FIG. 3, there is a minimum of one MAC flow.

Figure 4:
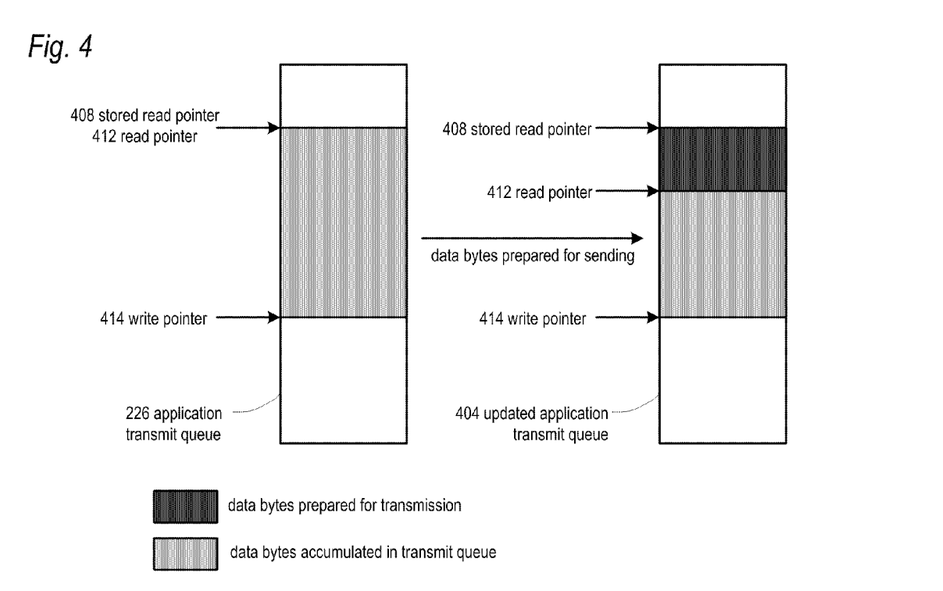
FIG. 4 is a block diagram of an application transmit queue of the present invention.

Referring now to FIG. 4, a block diagram of an application transmit queue 226 of the present invention is shown. Each RLPflow 324-336 has an application transmit queue 226. The application transmit queue 226 provides temporary storage of the data packets the AT transmits to the AN. Each application transmit queue 226 has an associated write pointer 414, read pointer 412, and stored read pointer 408. The RTM 218 creates an updated application transmit queue 404 by transferring data bytes prepared for sending to the application transmit queue 226 and updating the read pointer 412 to point to the start of the new data bytes. The application transmit queue 226 therefore contains both ACK (new) data and NAK (previous) data, so that either one is available to transmit to the AN based on the decoded ACK/NAK. In the event a NAK is decoded, the RTM 218 can rollback the data resided between the read pointer 412 and the stored read pointer 408 in the application transmit queue 226 so that the previous data is correctly transmitted to the AN.

Figure 5:
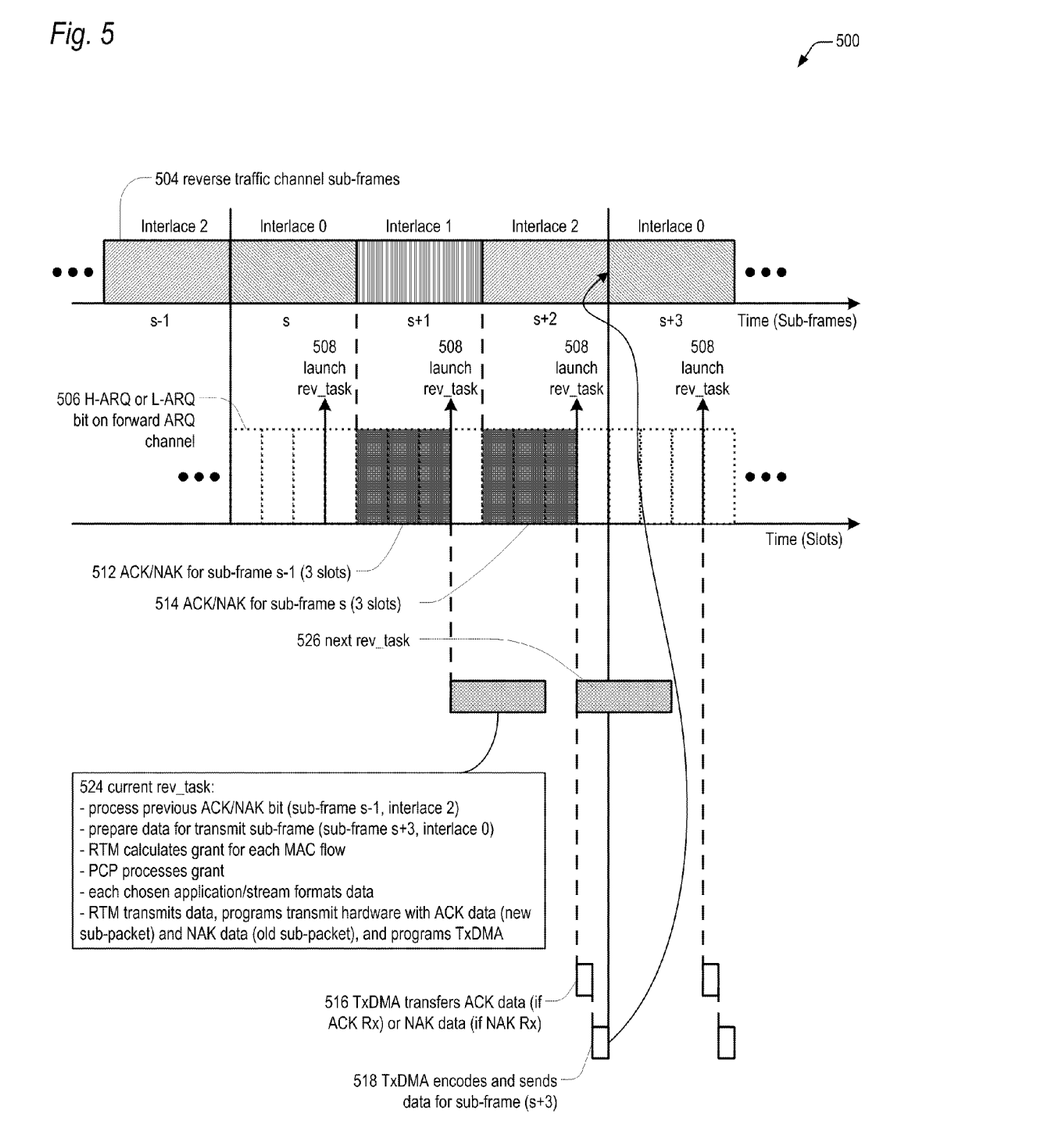
FIG. 5 is a timing diagram illustrating the operation sequence of the present invention.

Referring now to FIG. 5, a timing diagram 500 illustrating the operation sequence of the present invention is shown. The reverse traffic channel 232 includes a continuous sequence of reverse traffic channel sub-frames 504, which carry data from the AT to the AN. The timing shown in FIG. 5 assumes an interlace of three, although the same timing sequence occurs regardless of the actual interlace used. Interlace 0 occurs in sub-frame s and s+3, interlace 1 occurs in sub-frame s+1, and interlace 2 occurs in sub-frames s−1 and s+2.

The AT transmits reverse traffic channel sub-frames 504 to the AN, and the AN responds to the transmission of each sub-frame with an H-ARQ or L-ARQ bit on the forward ARQ channel 506. Each sub-frame 504 is 4 slots long, where each slot is equal to 1.667 milliseconds. The AN transmits the H-ARQ or L-ARQ bit on the forward ARQ channel 506 to the AT in the first three slots of the second sub-frame following the sub-frame in which the AT transmits the data to the AN. Therefore, in sub-frame s−1, the AT transmits data in interlace 2 to the AN, and the AN responds in sub-frame s+1 with ACK/NAK for sub-frame s−1 (3 slots) 512. In sub-frame s, the AT transmits data in interlace 0 to the AN, and the AN responds in sub-frame s+2 with ACK/NAK for sub-frame s (3 slots) 514. The ACK/NAK always occurs in the sub-frame immediately preceding the transmission of the next sub-packet for the same interlace. As stated previously with respect to FIG. 1, only one slot is between the end of the ACK/NAK and the start of the sub-frame 504 containing the next sub-packet.

The present invention relieves this timing pressure on the AT by starting the process of preparing the next sub-packet for transmission five slots before the AT actually transmits the sub-packet. The RTM 218 launches a rev_task process 508 every fourth slot. For clarity, only two rev_task processes 508 are shown, a current rev_task 524 and a next rev_task 526. However, it should be understood that the RTM 218 periodically launches the rev_task process 508 every fourth slot.

The current rev_task process 524 starts to prepare transmit data for sub-frame s+3 in the fourth slot of sub-frame s+1. Each rev_task process 508 begins by first processing the previous ACK/NAK bit. For the current rev_task process 524, the previous ACK/NAK bit is the ACK/NAK for sub-frame s−1 512. The ACK/NAK for sub-frame s−1 512 corresponds to the data sub-packet the AT transmits in sub-frame s−1 during interlace 2. The next step is to prepare data for the transmit sub-frame. The transmit sub-frame is the sub-frame starting 5 slots after the launch of a rev_task process 508. For the current rev_task 524, the transmit sub-frame is sub-frame s+3 in interlace 0.

After preparing data for the transmit sub-frame, the RTM 218 next calculates a grant for each MAC flow 306, 308, 312. A grant is an allocation of data bytes to each of the applications in a MAC flow 306, 308, 312 for the upcoming sub-frame transmission. The applications share the grant, with the highest priority application filling up first. The sub-frame transmission frame consists of multiple packets from each MAC flow 306, 308, 312, hence the RTM 218 generates multiple grants, one for each MAC flow 306, 308, 312, when preparing the frame. The CDMA2000 High Rate Packet Data Air Interface Specification, 3GPP2 C.S0024-A Version 2.0 specifies the algorithm for calculating a grant.

The next step is the packet consolidation protocol layer (PCP) 234 processes the grant for each MAC flow 306, 308, 312. Each grant is given to the PCP layer 234 and the application layer 236. The PCP layer 234 processes the grant by preparing the data bytes for transmission according to what the grant gives, e.g. 100 bytes of grant means an application can prepare up to 100 bytes of data.

After the PCP 234 processes the grant for each MAC flow 306, 308, 312, each chosen application/stream formats the data. A stream 338, 342 is simply a grouping of several RLPflows 324-336 with common attributes. The air interface can support up to four parallel application streams. The first stream (Stream 0 338) always carries signaling, and the other three carry RLPflows with different quality of service (QoS) requirements.

Each application is associated with a stream 338, 342 and resides in a MAC flow 306, 308, 312, as shown in FIG. 3. Each MAC flow 306, 308, 312 consists of several RLPflows 324-336, each of which is associated with a stream 338, 342. The PCP layer 234 requests priority from each application. The PCP 234 then allocates a grant to the application with the highest priority. After allocating the grant to the application with highest priority, the PCP 234 allocates leftover data to applications with lower priority. An application/stream formats the data by first deciding the number of data bytes to take out for transmission. The application/stream then adds and encodes the header information and tail information, if any. In some protocol (e.g. encryption) formatting the data may involve translating/encoding the data to a different pattern.

The last step of the current rev_task process 524 is the RTM 218 programs a DMA transmit data transfer (TxDMA), programs transmit hardware 228 with ACK data (for a new sub-packet) and NAK data (for an old sub-packet), the TxDMA encodes transmit data at the physical layer, using required headers and trailers, and the transmitter hardware 228 transmits data on the reverse traffic channel 232. At this point, the current rev_task process 524 completes and the RTM 218 prepares for the next rev_task process 526 to begin.

Figure 6:
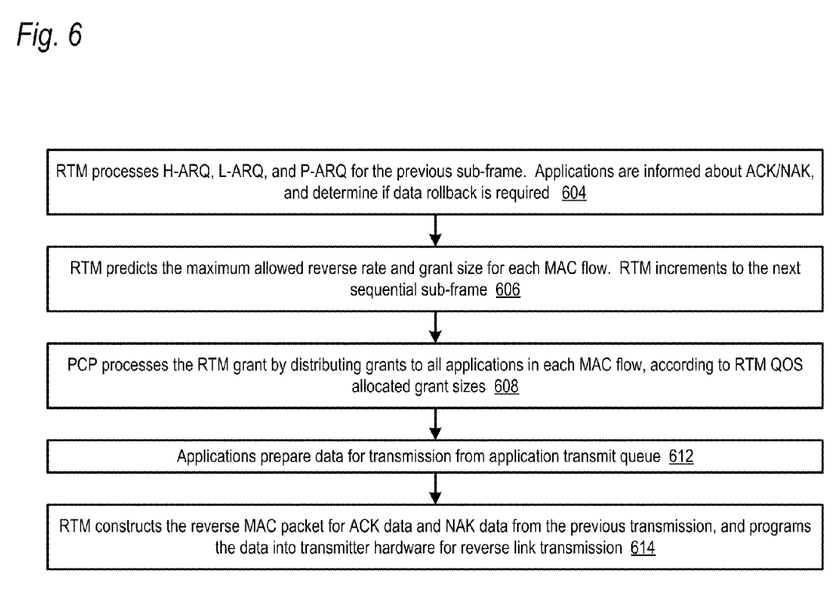
FIG. 6 is a flowchart illustrating the high-level process of the present invention.

Referring now to FIG. 6, a flowchart illustrating the high-level process of the present invention is shown. Flow begins at block 604.

At block 604, the RTM 218 processes the H-ARQ bit 112, L-ARQ bit 108, and P-ARQ bit 106 for the previous sub-frame 504. The RTM 218 informs applications about the ACK/NAK states of the H-ARQ bit 112, L-ARQ bit 108, and P-ARQ bit 106, and determines if sub-packet data requires data rollback. Data rollback is a process adjustment whereby the RTM 218 selects previous sub-packet data for retransmission, after the RTM 218 processes a NAK. Data rollback is not required if the RTM 218 processes an ACK, since the RTM 218 assumes the AT will receive an ACK and prepares the next sub-packet as a default operation. Block 604 is described in more detail with respect to FIG. 7. Flow proceeds to block 606.

At block 606, the RTM 218 predicts the maximum allowed reverse rate and grant size for each MAC flow 306, 308, 312. After predicting the maximum allowed reverse rate and grant size for each MAC flow 306, 308, 312, the RTM 218 increments to the next sequential sub-frame 504. Flow proceeds to block 608.

At block 608, the packet consolidation protocol (PCP) layer 234 processes the RTM 218 grant by distributing grants to all applications in each MAC flow 306, 308, 312, according to RTM 218 quality of service (QOS) allocated grant sizes. Flow proceeds to block 612.

At block 612, the applications prepare data for transmission from the application transmit queue 226. Flow proceeds to block 614.

At block 614, the RTM 218 constructs the reverse MAC packet for ACK data and NAK data from the previous transmission, and programs the data into transmitter hardware 228 for reverse link transmission on the reverse traffic channel 232. Flow ends at block 614.

Figure 7:
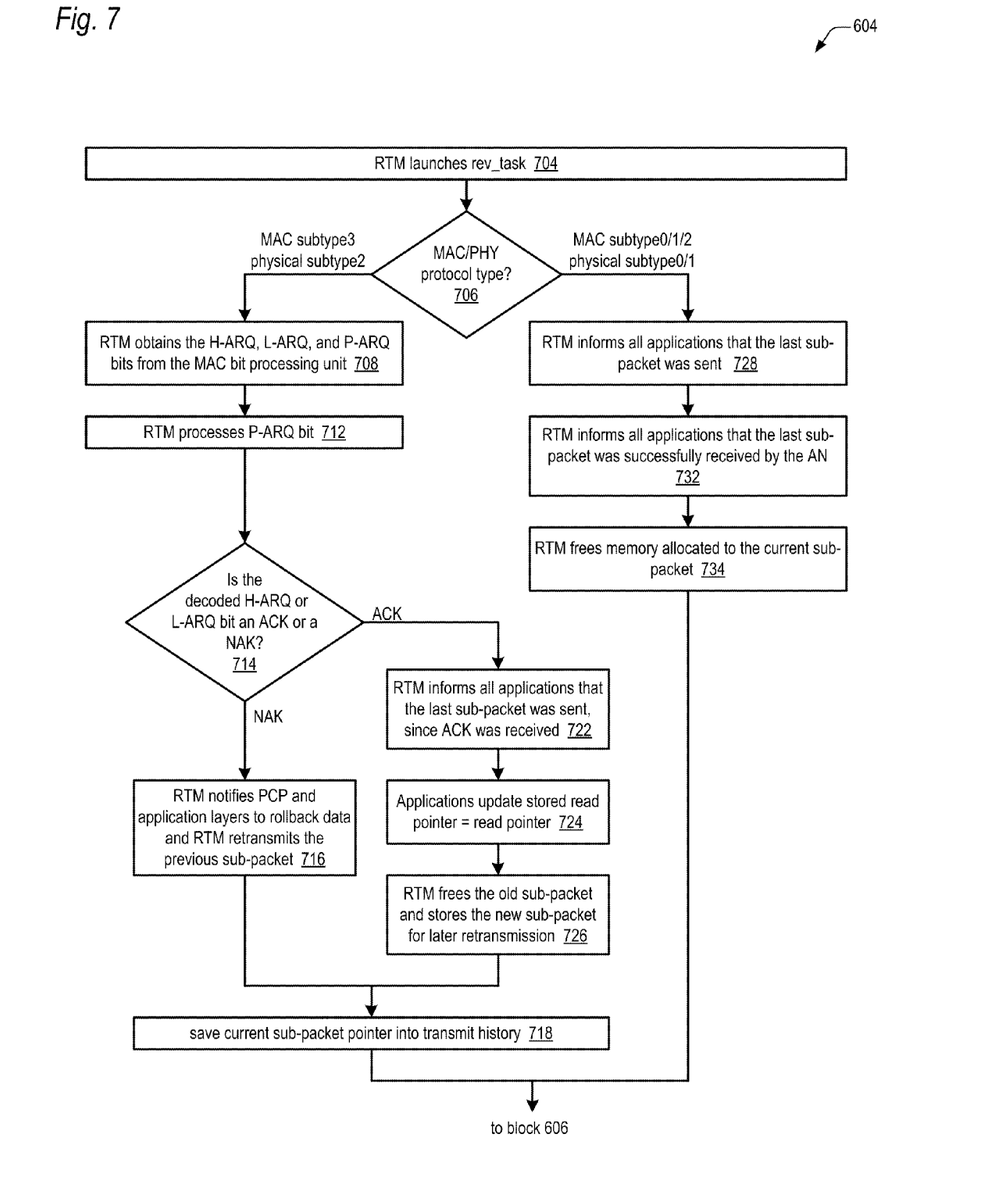
FIG. 7 is a flowchart illustrating the details of block 604 of FIG. 6 of the present invention.

Referring now to FIG. 7, a flowchart illustrating the details of block 604 of FIG. 6 of the present invention is shown. Flow begins at block 704.

At block 704, the RTM 218 launches the rev-task 508 process. The rev-task 508 process was described briefly with respect to FIG. 5, and is described in its entirety in FIGS. 6-8. Every fourth slot, the RTM 218 periodically launches the rev_task 508 process at the same slot boundary in every sub-frame 504. Flow proceeds to decision block 706.

At decision block 706, the RTM 218 determines the type of MAC and Physical layer protocol in use. Any of subtype 0, 1, 2, or 3 MAC layer protocols may use the present invention. If the MAC layer protocol is subtype 0, 1, or 2 and the physical layer protocol is subtype 0 or 1, then flow proceeds to block 728. If the MAC layer protocol is subtype 3, then the physical layer protocol is subtype 2 and flow proceeds to block 708.

At block 708, the RTM 218 obtains the H-ARQ bit 112, L-ARQ bit 108, and the P-ARQ bit 106 from the MAC bit processing unit 208. Flow proceeds to block 712.

At block 712, the RTM 218 processes the P-ARQ bit 106. This will determine the final decision on the H-ARQ transmission, after the intermediate retransmissions have taken place. The RTM 218 conveys this decision to all applications for further upper layer retransmission at a later time, if necessary. Flow proceeds to decision block 714.

At decision block 714, the RTM 218 determines if the decoded H-ARQ bit 112 or the L-ARQ bit 108 is an ACK or a NAK. If the decoded H-ARQ bit 112 or L-ARQ bit 108 is a NAK, then the AN did not properly receive the sub-packet corresponding to the H-ARQ bit 112 or L-ARQ bit 108, and flow proceeds to block 716. If the decoded H-ARQ bit 112 or L-ARQ bit 108 is an ACK, then the AN did properly receive the sub-packet corresponding to the H-ARQ bit 112 or L-ARQ bit 108, and flow proceeds to block 722.

At block 716, the AT receives a NAK, and the RTM 218 notifies the packet consolidation protocol (PCP) layer 234 and the application layer protocol 236 to rollback data. The RTM 218 retransmits the previous sub-packet. Block 716 is described in more detail with respect to FIG. 8. Flow proceeds to block 718.

At block 718, the RTM 218 saves the current sub-packet pointer into transmit history. Flow proceeds to block 606.

At block 722, the AT receives an ACK, and the RTM 218 informs all applications that the last sub-packet was sent, since the MAC bit processing unit 208 received an ACK. Flow proceeds to block 724.

At block 724, the applications update the stored read pointer 408 in the application transmit queue 226 for that application by copying the read pointer 412 to the stored read pointer 408. Flow proceeds to block 726.

At block 726, the RTM 218 frees up the old sub-packet and stores the new sub-packet for later retransmission. The RTM 218 frees up the old sub-packet by de-allocating the memory used to store the old sub-packet in the application transmit queue 226. The RTM 218 stores the new sub-packet in the same memory locations in the application transmit queue 226 as the old sub-packet. Flow proceeds to block 718.

At block 728, the AT is using the MAC protocol subtype 0, 1, or 2 and physical subtype 0 or 1. The RTM 218 informs all applications that the last sub-packet was sent. Flow proceeds to block 732.

At block 732, the RTM 218 informs all applications that the AN successfully received the last sub-packet. Flow proceeds to block 734.

At block 734, the RTM 218 frees memory allocated to the current sub-packet. Flow proceeds to block 606.

Figure 8:
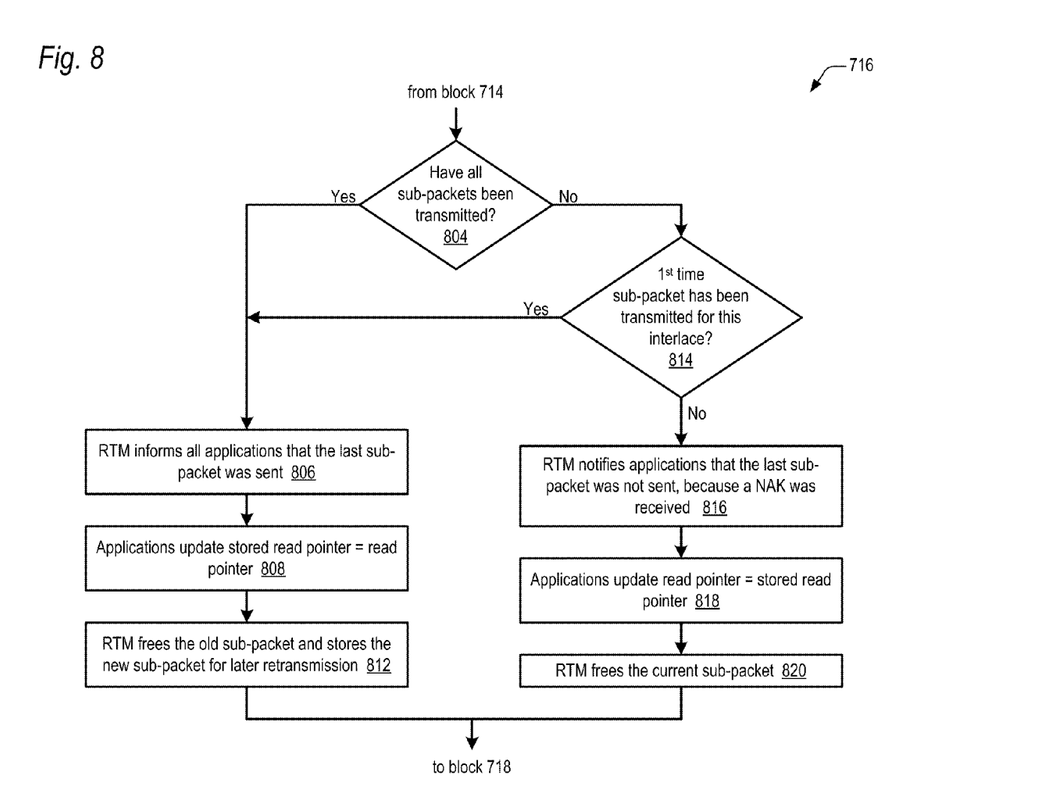
FIG. 8 is a flowchart illustrating the process details of block 716 of FIG. 7 of the present invention.

Referring now to FIG. 8, a flowchart illustrating the process details of block 716 of FIG. 7 of the present invention is shown. Flow begins at decision block 804.

At decision block 804, the RTM 218 determines if the AT has transmitted all sub-packets. The AT transmits a sub-packet a first time, and depending on the ACK/NAK state the AT receives from the AN, the AT retransmits the sub-packet up to three times in sequence. If the AT transmits all sub-packets, then the RTM 218 informs the application layer 236 that the AT sent the prepared sub-packet, and flow proceeds to block 806. If the AT has not transmitted all sub-packets, then flow proceeds to decision block 814.

At block 806, the RTM 218 informs all applications that the last sub-packet was sent. Flow proceeds to block 808.

At block 808, the applications update the stored read pointer 408 in the application transmit queue 226 for that application by copying the read pointer 412 to the stored read pointer 408. Flow proceeds to block 812.

At block 812, the RTM 218 frees the old sub-packet and stores the new sub-packet for later retransmission. Flow proceeds to block 718.

At decision block 814, the RTM 218 determines if the previous sub-packet transmission was the first time the AT transmits or retransmits the sub-packet for the current interlace. If this is the first time the AT transmits the sub-packet for the current interlace, then flow proceeds to block 806. If this is not the first time the AT transmits the sub-packet for the current interlace, then flow proceeds to block 816.

At block 816, the RTM 218 notifies applications that the last sub-packet was not sent, because the AT received a NAK. Flow proceeds to block 818.

At block 818, the applications update the read pointer 412 in the application transmit queue 226 for that application by copying the stored read pointer 408 to the read pointer 412. Flow proceeds to block 820.

At block 820, the RTM 218 frees up the current sub-packet. Flow proceeds to block 718.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A method for providing improved reverse link transmission timing, the method comprising:
   within an access terminal, for each application in a MAC flow, storing both new data and previous data in an application transmit queue, so that either one is available to transmit to an access node based on a decoded ACK/NAK;
   processing at least one automatic repeat request (ARQ) bit for a previous sub-frame received from the access node;
   calculating a grant size for the MAC flow;
   distributing grants to each application in the MAC flow;
   preparing data for transmission, based on the ARQ bit; and
   transmitting the prepared data.

2. The method as recited in claim 1, wherein the access terminal performs the storing, processing, calculating, distributing, preparing, and transmitting steps as part of a reverse traffic channel MAC (RTM) subtype3 protocol.

3. The method as recited in claim 2, wherein the preparing data for transmission comprises a packet consolidation protocol (PCP) collecting and consolidating application packets into one connection layer packet and passing a linked list of data pointers to the RTM for transmission.

4. The method as recited in claim 1, wherein the previous sub-frame is the reverse traffic channel sub-frame that the access terminal transmitted data that the ARQ bit were provided in response thereto.

5. The method as recited in claim 1, wherein the at least one ARQ bit comprises a hybrid ARQ (H-ARQ) bit, a last ARQ (L-ARQ) bit, and/or a packet ARQ (P-ARQ) bit.

6. The method as recited in claim 5, wherein processing the P-ARQ bit comprises determining if the access terminal retransmitted a reverse traffic channel physical sub-packet corresponding to the P-ARQ bit, and communicating the result of said determining to each application in the MAC flow.

7. The method as recited in claim 5, wherein processing the H-ARQ or the L-ARQ bit comprises determining if the processed bit is an ACK or a NAK, and in response to determining if the processed bit is an ACK or a NAK:
    if the processed bit is a NAK, notifying a packet consolidation protocol (PCP) layer and an application layer to rollback the data in the application transmit queue corresponding to the processed bit and informing the PCP and application layers that the access terminal retransmitted a previous sub-packet; and
    if the processed bit is an ACK, informing all applications that the access terminal sent the current sub-packet, freeing up memory to store a new sub-packet, and storing the new sub-packet in the memory for later retransmission.

8. The method as recited in claim 7, wherein the PCP layer and the application layer rolling back the data comprise each application in the MAC flow updating a read pointer in the application transmit queue.

9. The method as recited in claim 8, wherein updating the read pointer comprises copying the stored read pointer to the read pointer.

10. The method as recited in claim 7, wherein freeing up the memory to store the new sub-packet comprises updating the stored read pointer in the application transmit queue.

11. The method as recited in claim 10, wherein updating the stored read pointer comprises copying a read pointer to the stored read pointer.

12. The method as recited in claim 1, wherein transmitting the data comprises constructing a reverse MAC packet for transmission and programming the data into transmitter hardware for reverse link transmission.

13. The method as recited in claim 12, wherein the reverse MAC packet comprises ACK data and NAK data in the same interlace as the last sub-packet the access terminal previously transmitted in the same interlace as the ACK and NAK data.

14. An access terminal providing improved reverse link transmission timing, comprising:
    a MAC bit processing unit, configured to process at least one automatic repeat request (ARQ) bit from for the previous sub-frame;
    an application transmit queue, storing both new data and previous data, so that either one is available to transmit to an access node based on a decoded ACK/NAK;
    a reverse traffic channel MAC (RTM) subtype3 protocol, configured to read the said at least one processed ARQ bit from the MAC bit processing unit, calculate the grant size for a MAC flow, distribute grants to all applications in the MAC flow, store a stored read pointer in the application transmit queue for all applications in the MAC flow, prepare data for transmission, and transmit the data.

15. The access terminal as recited in claim 14, wherein preparing data for transmission comprises a packet consolidation protocol (PCP) layer collecting and consolidating application packets into one connection layer packet and passing a linked list of data pointers to the RTM for transmission.

16. The access terminal as recited in claim 14, wherein the previous sub-frame is the reverse traffic channel sub-frame that the access terminal transmitted data that the ARQ bits were provided in response thereto.

17. The access terminal as recited in claim 14, wherein the at least one ARQ bit comprises a hybrid ARQ (H-ARQ) bit, a last ARQ (L-ARQ) bit, and/or a packet ARQ (P-ARQ) bit.

18. The access terminal as recited in claim 17, wherein processing the P-ARQ bit comprises determining if the access terminal will retransmit a reverse traffic channel physical sub-packet corresponding to the P-ARQ bit, and communicating the result of said determining to all applications in the MAC flow.

19. The access terminal as recited in claim 17, wherein processing the H-ARQ bit or the L-ARQ bit comprises determining if the processed bit is an ACK or a NAK, and in response to determining if the processed bit is an ACK or a NAK:
    if the processed bit is a NAK, notifying a packet consolidation protocol (PCP) layer and an application layer to rollback the data in the application transmit queue corresponding to the processed bit and informing the PCP and application layers that the access terminal retransmitted a previous sub-packet; and
    if the processed bit is an ACK, informing all applications that the current sub-packet was sent, freeing up memory to store a new sub-packet, and storing the new sub-packet in the memory for later retransmission.

20. The access terminal as recited in claim 19, wherein the PCP layer and the application layer rolling back the data comprise each application in the MAC flow updating the read pointer in the application transmit queue.

21. The access terminal as recited in claim 20, wherein updating the read pointer comprises copying the stored read pointer to the read pointer.

22. The access terminal as recited in claim 19, wherein freeing up the memory to store a new sub-packet comprises updating the stored read pointer in the application transmit queue.

23. The access terminal as recited in claim 22, wherein updating the stored read pointer comprises copying the read pointer to the stored read pointer.

24. The access terminal as recited in claim 14, wherein transmitting the data comprises constructing a reverse MAC packet for transmission and programming the data into transmitter hardware for reverse link transmission.

25. The access terminal as recited in claim 24, wherein the reverse MAC packet comprises ACK data and NAK data in the same interlace as the last sub-packet the access terminal previously transmitted in the same interlace as the ACK and NAK data.

* * * * *